Figure 1:
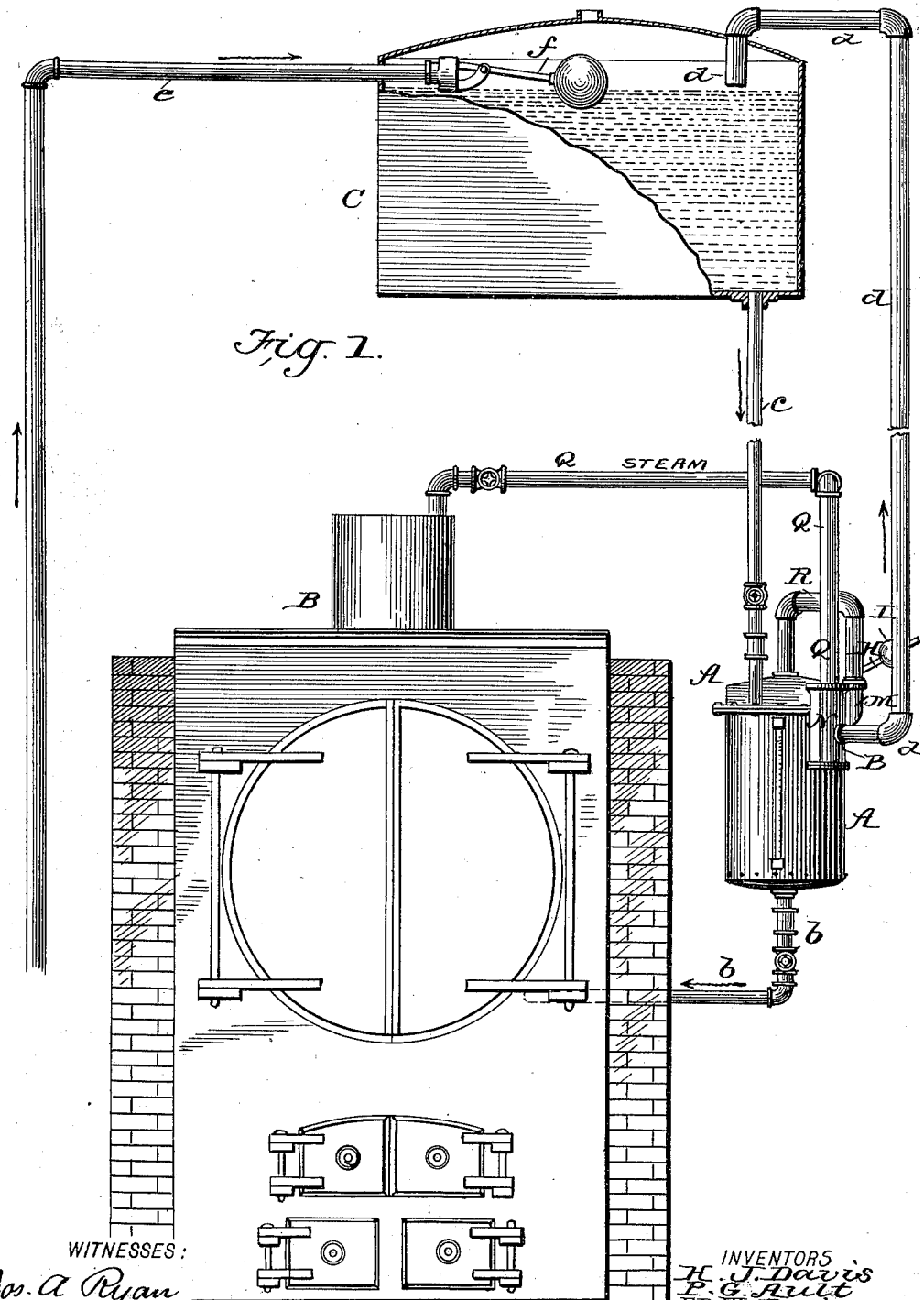

No. 663,735. Patented Dec. 11, 1900.
H. J. DAVIS, P. G. AULT, W. W. BAILEY & J. H. WIDEMAN.
BOILER FEEDER.
(Application filed Oct. 1, 1900.)
(No Model.) 4 Sheets—Sheet 1.

WITNESSES:
INVENTORS
ATTORNEYS

No. 663,735. Patented Dec. 11, 1900.
H. J. DAVIS, P. G. AULT, W. W. BAILEY & J. H. WIDEMAN.
BOILER FEEDER.
(Application filed Oct. 1, 1900.)
(No Model.) 4 Sheets—Sheet 2.
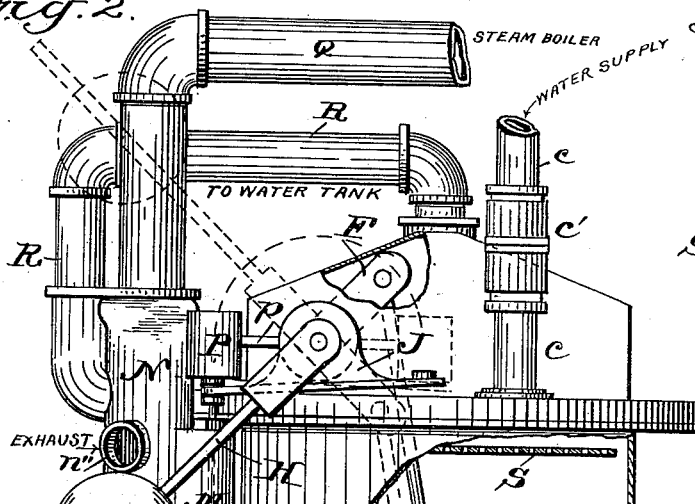
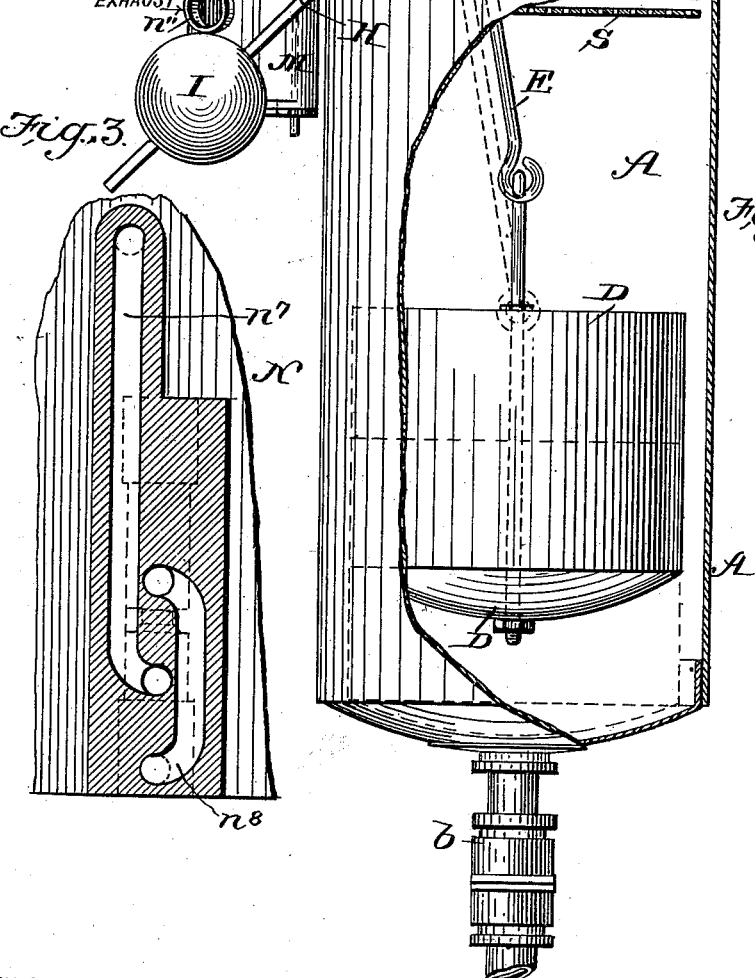
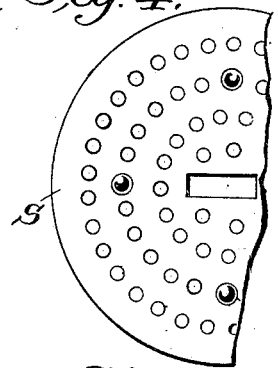
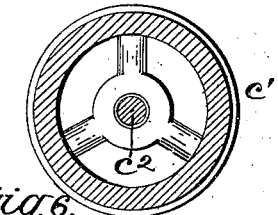
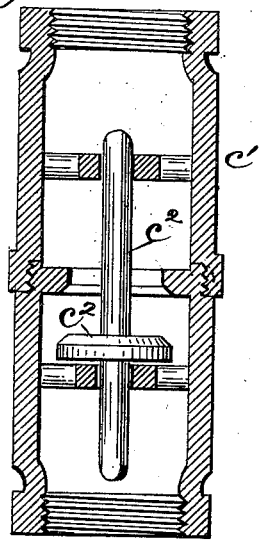
WITNESSES
Jos. A. Ryan
Amos W Hart
INVENTORS
H. J. Davis
P. G. Ault
W. W. Bailey
J. H. Wideman
ATTORNEYS

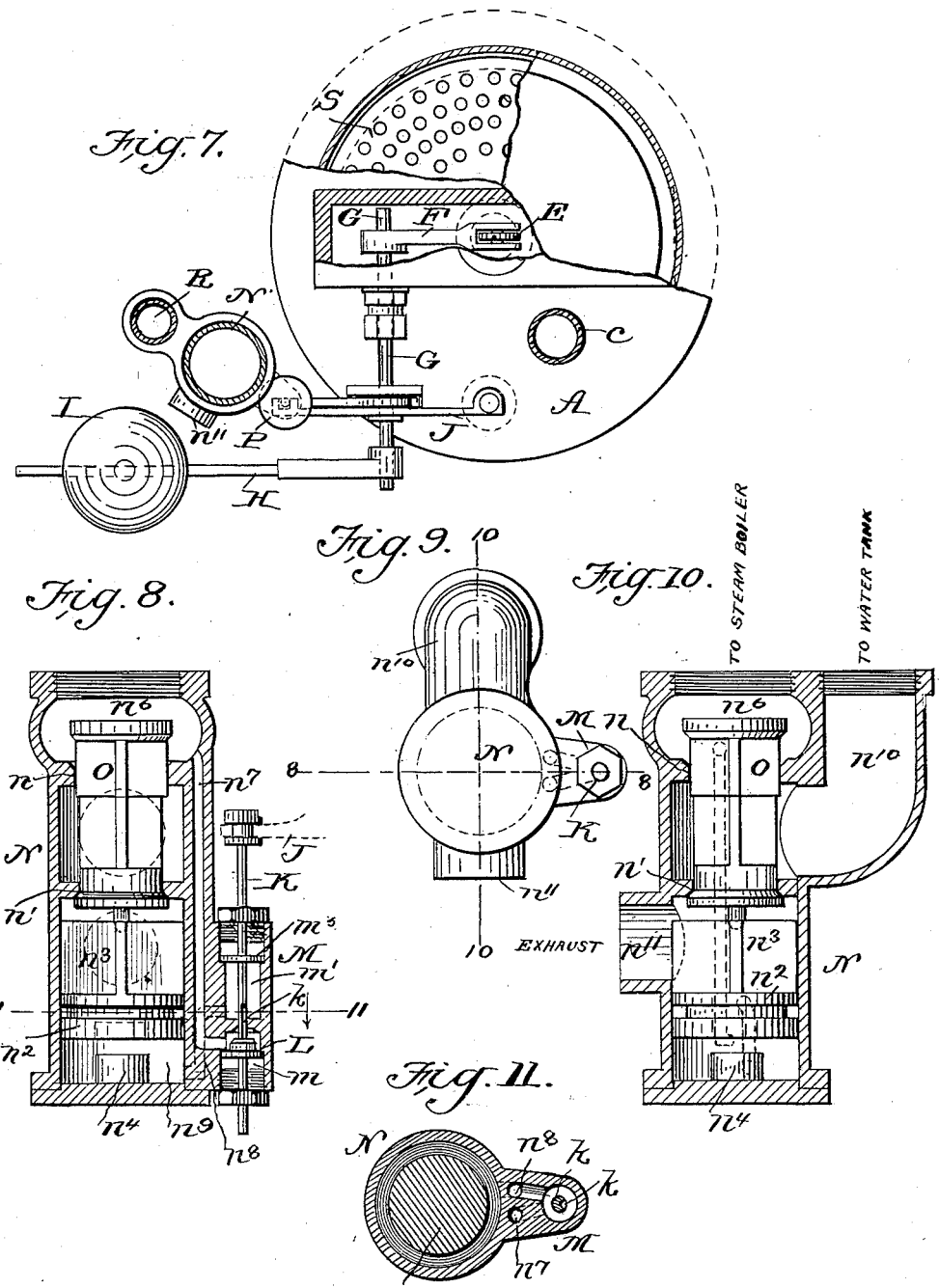

No. 663,735. Patented Dec. 11, 1900.
H. J. DAVIS, P. G. AULT, W. W. BAILEY & J. H. WIDEMAN.
BOILER FEEDER.
(Application filed Oct. 1, 1900.)
(No Model.) 4 Sheets—Sheet 4.
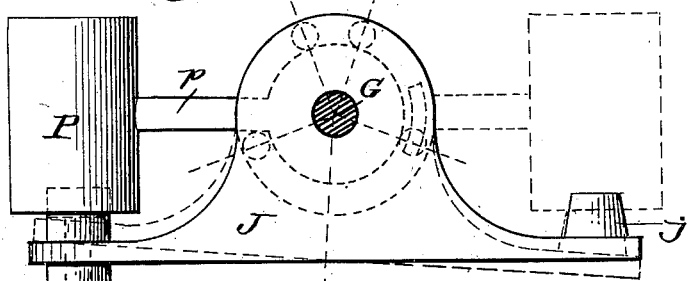
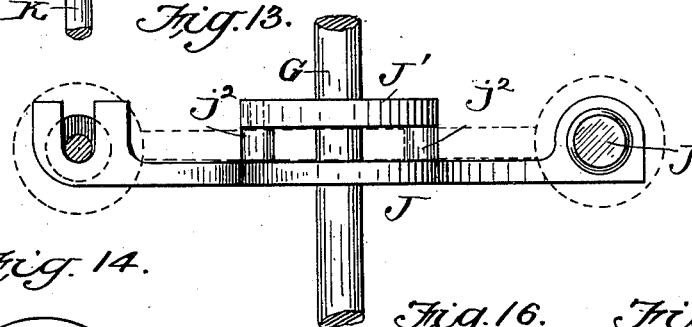
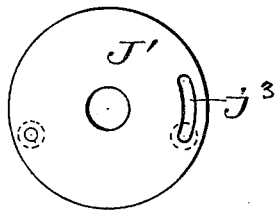
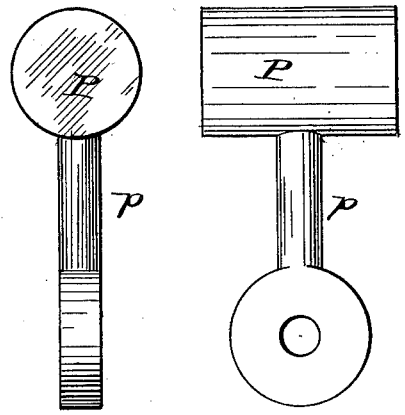
WITNESSES
Jos. A. Ryan
Amos W. Hart
INVENTORS.
H. J. Davis
P. G. Ault
W. W. Bailey
J. H. Wideman
BY Munn & Co.
ATTORNEYS
THE NORRIS PETERS CO., PHOTO-LITHO., WASHINGTON, D. C.

UNITED STATES PATENT OFFICE.

HENRY J. DAVIS, PLAYFAIR G. AULT, WILBER W. BAILEY, AND JAMES H. WIDEMAN, OF BIRMINGHAM, ALABAMA.

BOILER-FEEDER.

SPECIFICATION forming part of Letters Patent No. 663,735, dated December 11, 1900.

Application filed October 1, 1900. Serial No. 31,649. (No model.)

*To all whom it may concern:*

Be it known that we, HENRY J. DAVIS, PLAYFAIR G. AULT, WILBER W. BAILEY, and JAMES H. WIDEMAN, citizens of the United States, residing at Birmingham, in the county of Jefferson and State of Alabama, have made certain new and useful Improvements in Boiler-Feeders, of which the following is a specification.

The object of our invention is to continuously and automatically maintain a uniform water-level in a boiler.

The invention relates particularly to an improvement upon the boiler-feeder for which we obtained Letters Patent of the United States No. 655,064, dated July 31, 1900. In our present invention the mechanism has been greatly simplified and a considerable economy effected, besides providing for an instant operation of the valve which regulates the action of the main valve governing the admission of steam to the water-tank.

The details of construction, arrangement, and operation of parts are as hereinafter described, reference being had to the accompanying drawings, in which—

Figure 1 represents our invention in connection with a boiler and water-supply tank. Fig. 2 is an enlarged side view, a portion being broken away, of our present invention. Fig. 3 is an enlarged vertical section showing the arrangement of ports between the cylinders or chambers of the main valve and the smaller regulating-valve. Fig. 4 is a plan view of a portion of the foraminous baffle-plate arranged in the water-tank. Fig. 5 is a cross-section of the device shown in Fig. 6. Fig. 6 is a longitudinal section of a portion of the water-supply pipe containing the check-valve. Fig. 7 is a plan view, part being in section, of the water-tank and its attachments. Fig. 8 is a longitudinal section of the two valve-chambers on the line 8 8 of Fig. 9. Fig. 9 is a plan view of the valve-chambers. Fig. 10 is a vertical section on the line 10 10 of Fig. 9, the same being taken at right angles to the section shown in Fig. 8. Fig. 11 is a horizontal section on the line 11 11 of Fig. 8. Fig. 12 is a side view of the mechanism for instantaneously shifting the position of the smaller governing-valve. Fig. 13 is a plan view of the same, part being in section. Figs. 14 and 15 show certain details or parts of the mechanism illustrated in Figs. 12 and 13. Figs. 16 and 17 are edge and side views of the shifting hammer or weight employed for actuating the small governing-valve.

As shown in Fig. 1, our water-tank A is connected with a steam-boiler B by means of pipes Q and $b$. The said tank is also connected by pipes $c$ and $d$ with the condensing-tank C, from which the water-supply is received. The said tank C is provided with a pipe $e$, having an automatic valve attachment $f$, which includes a float and whose operation is apparent. The water from tank C is supplied to the tank A through the pipe $c$, which is provided with a coupling $c'$, containing a check-valve $c^2$. This valve seats upward and is closed whenever the steam-pressure in the tank A reaches a certain degree. The exhaust-steam from the water-tank A is conducted by the pipe $d$ into the supply-tank C, where it is condensed, and thus aids in heating the water that is subsequently conveyed to the tank A by means of the pipe $c$. The tank A, as shown in Fig. 1, is provided with a steam-jacket, which will in practice be connected with the boiler B by means of pipes which permit the circulation of steam or hot water, and thus always keep the tank proper at a high temperature. One of these pipes will necessarily be so arranged as to drain the water of condensation back to the boiler by gravity.

In Fig. 2 the tank A is shown unprovided with a steam-jacket. Within said tank is a water-displacing weight D, which is made of any suitable material adapted to float in water. It is connected, by means of a jointed rod E, with one arm F of a rock-shaft G, (see Fig. 7,) which is arranged in suitable bearings and provided with a lever-arm H, carrying a weight I, that is adjustable thereon and so arranged with respect to the weight D that the latter will raise the former when it is out of the water, but will be itself raised when partly submerged. This weight F is practically a governor for regulating the level of the water in the boiler—that is to say, by adjusting it on the lever-arm H toward the rock-shaft G the apparatus will feed the water to a higher level and by moving it outward on said arm the feed or supply will be less. The weight I may be held in any adjustment by means of a clamp-screw or other suitable device. A tappet-lever J (see Figs. 7, 12, and 13) is loose on the rock-shaft G, and thus adapted to oscillate with the latter as the weight D rises or falls in the tank A. One end of said tappet-lever J is loosely connected with the valve-stem K, which actuates the smaller regulating-valve L, (see Fig. 8,) so that as said lever J oscillates it will seat and unseat the valve L in its cylinder or chamber M, and thereby govern the admission of steam to the main cylinder N, which contains the main valve O. At the right-hand end of the lever J a knob $j$ is provided, as shown in Figs. 12 and 13. The hammer or weight P, having an arm $p$, is mounted on the shaft G and adapted to be thrown from right to left, as shown by full and dotted lines in Fig. 12, for the purpose of operating the valve L—that is to say, when the said hammer P strikes upon the head of the valve-stem K, as shown in Fig. 12, the valve L is unseated or forced downwardly instantly, and, on the other hand, when the hammer P is thrown over to the right, as shown in Fig. 12, it strikes upon the bottom $j$ of the tappet-lever J, thereby shifting the latter so that its opposite end raises the valve-stem K, and thereby closes the valve L on its seat. A disk J' is fixed on the shaft G (see Figs. 13 and 14) and provided at opposite points with lateral projections $j^2$, (see Figs. 13 and 15,) which consist of screws having enlarged heads. One of these screws $j^2$ is adapted for adjustment in an arc slot $j^3$. (See Fig. 14.) When the shaft G is rocked by the rise and fall of the weight D in tank A, the disk J' is necessarily rocked with it, and the pins or projections $j^2$ then serve to alternately raise the hammer P by contact with its shank $p$, so as to throw it over from one side to the other, as illustrated in Fig. 12, by which action the tappet-lever J, which is loosely mounted on the shaft G, is shifted, as before described.

We will now describe in detail the construction, arrangement, and operation of the valve mechanism proper.

As before stated, we employ a main-valve cylinder N and a smaller-valve cylinder M, which are arranged vertically side by side and constructed or cast integrally. The main valve O has two heads and two valve-seats. In other words, it seats down on the upper diaphragm $n$ in the cylinder N and seats upward on the lower diaphragm $n'$. A piston $n^2$ is connected by a shank $n^3$ with the valve proper, O, and works in the lower portion of the cylinder or chamber N. It is prevented from closing against the lower end of said chamber by means of an abutment $n^4$. The pipe Q connects the steam-boiler with the large cylinder or valve-chamber N. The chamber $n^6$, formed in the upper portion of the cylinder N, is connected by a port $n^7$ with a chamber $m$ of cylinder M, in which a controlling-valve L is located. The stem K of said valve L is provided with a longitudinal groove $k$, (see Fig. 8,) through which steam has access to the chamber $m'$ in cylinder M. From such chamber $m'$ a port or passage $n^8$ leads into the chamber $n^9$ below the piston $n^2$, as also shown in Fig. 8. The arrangement and relation of these ports $n^7$ and $n^8$ are further illustrated in Fig. 3. A washer $m^3$ is arranged in the upper portion of the smaller cylinder N for holding the packing of valve-stem K in place. A pipe R connects the water-tank A with the cylinder N of the main valve O, the attachment being made at the side of said cylinder through the medium of a side passage $n^{10}$. (See Fig. 10.) It is apparent that steam has free passage from $n^6$ to $n^{10}$ when the main valve O is raised, as shown in Figs. 8 and 10, and that if the valve O be lowered or seated downward such communication will be cut off and steam may pass from pipe R through side passage $n^{10}$, past the valve O, and exhaust at $n^{11}$. (See Fig. 10.) The lateral passage $n^{10}$ and exhaust-opening $n^{11}$ are shown by dotted circles in Fig. 8. The feeder-tank A is placed adjacent to the boiler B at such height that the water-level in the tank will be the same as in the boiler when the weight D has fallen to its lowest position, as shown by dotted lines in Fig. 2. Supposing the tank A to be empty and the weight D at the downward limit of its movement, water is admitted by pipe $c$ and raises the weight D to the position shown by full lines, Fig. 2. In this operation the rock-shaft is rotated far enough to cause the disk J' to throw the hammer P from right to left, so that it strikes upon the head of the valve-stem, and thereby forces the valve L downward and off its seat, whereby steam is admitted by the groove $k$ in said stem K from port $n^7$ into chamber $m'$ in cylinder M, whence it passes by the short passage $n^8$ into the chamber $n^9$ beneath the piston $n^2$. The pressure of steam on the latter raises the main valve O to the position shown in Figs. 8 and 10, which permits steam to pass through diaphragm $n^{10}$ and thence by pipe R into the water-tank A. The steam-pressure in boiler B and tank A being thus equalized, the water contained in tank A passes by gravity into the boiler. In this manner the boiler receives a water charge automatically as often as required to keep the water-level practically uniform. A foraminous baffle-plate S is arranged in the upper portion of the tank A to receive the thrust of the water and steam and properly distribute the same, so that the weight D may not suddenly be forced down. The practical value of thus maintaining a uniform water-level is well known to every engineer. The machine is adapted to take condensation from coils of varying pressures, since it exhausts at every stroke and the condensation discharges during the time of exhaust. It differs in this respect from steam-traps, since the latter will not receive condensation from coils with varying pressures. The tank A will exhaust down to the pressure of the coil containing the highest pressure, and the check-valve provided for such coil will open and discharge its contents. The exhaust being still open, the pressure in the tank will continue to reduce until all the coils have discharged, and if the tank has not filled from these coils the deficiency will be made up from the regular water-supply, the area of the exhaust being equal to or greater than the combined condensation of all the condensation-pipes.

It will be noticed as a special feature of this apparatus that the valve-stem of the controlling-valve is operated instantaneously by means of the hammer dropping each way alternately, the blow in one direction falling upon the valve-stem and opening the valve and in the other direction falling upon the tappet-lever J, and thus closing the valve. This instantaneous opening and closing of the valve is particularly advantageous, since a gradual opening and closing of the same would cause it to balance in consequence of a lack of sufficient steam under the piston of the controlling-valve to hold the large valve to its seat. When the piston is working without any exhaust, as the steam is cut off it condenses very quickly, so the piston has only a one-half-inch stroke, and a cushion is provided for the same on its downward stroke.

As a brief résumé of the operation it may be stated that water is automatically admitted to the machine by gravity at a time when the connections to the boiler are closed automatically. When the tank becomes filled, the water is automatically cut off and the boiler connections at the same instant open, both top and bottom. Since the water in the tank A when full stands at a considerably higher level than that in the boiler and the pressure being equalized, it naturally falls into the boiler until the water-level is the same as in the tank. The boiler connections being then again automatically closed, the water connection is opened and the operation is repeated. When the tank has discharged its water into the boiler, it is full of steam at boiler-pressure. This pressure is relieved automatically at the same instant the boiler connections are closed and the exhaust-steam is conveyed to the condensing-tank C, whereby the water therein is heated before discharging into the tank A.

Having thus fully described our invention, what we claim as new, and desire to secure by Letters Patent, is—

1. In an apparatus of the character described, the combination, with a steam-boiler, water-tank, and pipes duly connecting the same, of a water-displacing weight or float in said tank, a main valve controlling the admission of steam from boiler to tank, and provided with a piston-head, and another valve, and ports connecting it with the main valve, and tappet mechanism operated by the weight as it rises and falls, and adapted to actuate the last-named or controlling valve, substantially as shown and described.

2. In an apparatus of the character described, the combination, with the steam-boiler, the water-tank and pipes duly connecting the same, of a displacing weight or float arranged in said tank, a rock-shaft arranged at the upper portion of the tank and provided with a weighted arm for balancing the displacing-weight, and a shiftable hammer or weight operated by said rock-shaft, a main valve controlling the admission of steam to the tank, and a controlling-valve duly connected by ports or passages with said main valve, such controlling-valves being suitably arranged to admit of its actuation, substantially as shown and described.

3. In an apparatus of the character described, the combination with the water-boiler and the tank having pipe connections substantially as specified, of a displacing weight or float arranged in the tank, a rock-shaft arranged on the upper portion of the latter and having a counterbalancing-weight as described, a main valve controlling the admission of steam to the tank, a smaller valve having ports connecting it with the main-valve cylinder and serving to control the position of the main valve, a hammer or weight mounted on the shaft and adapted to be shifted when the latter is rocked, and a tappet-lever connected with the stem of the controlling-valve and upon the opposite end of the tappet-lever, whereby as said hammer is shifted from one side to the other, it alternately depresses and raises the valve corresponding with the rise and fall of the water in the tank, substantially as shown and described.

4. In an apparatus of the character described, the combination, with the steam-boiler, the water-tank, a main-valve cylinder, a controlling-valve cylinder and valves arranged therein, pipes connecting the boiler and tank with the main-valve cylinder, of the displacing weight or float arranged in the water-tank and having a counterbalance as specified, a rock-shaft arranged transversely at the top of said tank, a disk which is fast on said rock-shaft and provided with lateral projections, a hammer or weighted arm journaled loosely on said shaft and adapted to engage the projections of said disk alternately, and a tappet-lever mounted loosely on said shaft and connected with the stem of the controlling-valve substantially as shown and described, whereby as the displacing-weight rises and falls, the said shaft and disk are rocked, and the hammer thereby shifted from right to left and left to right, alternately, thus striking the stem of the controlling-valve to depress it and the opposite end of the tappet-lever for raising said valve, alternately, substantially as shown and described.

5. In an apparatus of the character described, the combination, with the boiler, the tank, a displacing-weight in the latter, and mechanism connected therewith for operating the controlling-valve, of a main valve arranged in a cylinder duly connected with the boiler and tank, the controlling-valve arranged in an adjacent chamber or cylinder, and long and short ports or passages connecting the end chambers of the main-valve cylinder with the chambers in the smaller-valve chamber, which chambers are separated by a partition traversed by the valve-stem having a port or passage for steam, substantially as shown and described.

6. In an apparatus of the character described, the combination, with the steam-boiler, the water-tank, and a displacing-weight arranged in the latter, a valve-operating mechanism connected with said weight, of a main-valve chamber, and a controlling-valve chamber adjacent to the tank, pipes connecting the head and side of the main-valve chamber with the boiler and tank respectively, the main valve adapted to seat upward and downward and provided with a piston, steam-passages connecting the ends or end chambers of the main cylinder with the other cylinder, the controlling-valve arranged to pass above and below the exit of one of said passages, a port leading from the chamber of such controlling-valve to the chamber above, which port is closed when the valve is seated upward, substantially as shown and described.

HENRY J. DAVIS.
PLAYFAIR G. AULT.
WILBER W. BAILEY.
JAMES H. WIDEMAN.

Witnesses:
CHAS. B. LYTLE,
LYMAN W. MARTYN, Jr.